(12) United States Patent
Ramesh (10) Patent No.: US 9,168,589 B2
(45) Date of Patent: Oct. 27, 2015

(54) INDEXABLE DRILL INSERT

(75) Inventor: Karthic Ramesh, Bangalore (IN)

(73) Assignee: KENNAMETAL INDIA LIMITED, Bangalore (IN)

( * ) Notice: Subject to any disclaimer, the term of this patent is extended or adjusted under 35 U.S.C. 154(b) by 507 days.

(21) Appl. No.: 13/554,188

(22) Filed: Jul. 20, 2012

(65) Prior Publication Data

US 2013/0022423 A1 Jan. 24, 2013

(30) Foreign Application Priority Data

Jul. 22, 2011 (IN) .......................... 2525/CHE/2011

(51) Int. Cl.
*B23B 51/00* (2006.01)
*B23B 27/14* (2006.01)
*B23B 51/04* (2006.01)

(52) U.S. Cl.
CPC ............. *B23B 27/145* (2013.01); *B23B 51/048* (2013.01); *B23B 2200/0471* (2013.01); *B23B 2200/125* (2013.01); *B23B 2200/204* (2013.01); *B23B 2251/50* (2013.01); *Y10T 407/23* (2015.01); *Y10T 408/892* (2015.01)

(58) Field of Classification Search
CPC ..................... B23B 2251/50; B23B 2251/505; B23B 51/048; B23B 51/009
USPC ........................ 408/713, 187, 188, 223, 233
See application file for complete search history.

(56) References Cited

U.S. PATENT DOCUMENTS

| | | |
|---|---|---|
| 3,497,933 A | 3/1970 | Okada |
| 4,072,438 A | 2/1978 | Powers |
| 4,087,917 A | 5/1978 | Sheerer |
| 4,115,024 A | 9/1978 | Sussmuth |
| 4,131,383 A | 12/1978 | Powers |

(Continued)

FOREIGN PATENT DOCUMENTS

| | | |
|---|---|---|
| DE | 102006044605 A1 | 3/2008 |
| EP | 1813368 A2 | 8/2007 |

(Continued)

OTHER PUBLICATIONS

JP_2000061719_A_translation, obtained at http://dossier2.ipdl.inpit.go.jp/JP/application/P/1999-229114/13.08.1999_Description_59900785880.htm:JE (last visited Dec. 8, 2014).*

(Continued)

*Primary Examiner* — Sunil K Singh
*Assistant Examiner* — Ryan Rufo
(74) *Attorney, Agent, or Firm* — Larry R. Meenan (57) ABSTRACT

A quadrangular indexable drill insert includes: a top surface, a bottom surface, a side surface adjoining the top and bottom surfaces from four sides of the insert, four cutting edges configured at the intersection of the side surface and the top surface, and a screw hole disposed at the center of the insert. Each cutting edge includes: a first part edge; a second part edge extending from the first part edge; a third part edge extends away from a reference axis, a nose portion adjoins the first part edge with the third part edge of a succeeding cutting edge and a transitional edge joining the second and third part edges. The transitional part edge forms an angle of about 10° to about 90° with respect to the reference axis and forms a convex curve with the second part edge and a concave curve with the third part edge.

11 Claims, 10 Drawing Sheets

(56) References Cited

U.S. PATENT DOCUMENTS

| | | | |
|---|---|---|---|
| 4,189,265 A | 2/1980 | Arnold et al. | |
| 4,194,862 A | 3/1980 | Zweekly | |
| 4,475,851 A | 10/1984 | Hale | |
| 4,507,024 A | 3/1985 | Stashko | |
| 4,606,679 A | 8/1986 | Jeremias | |
| 4,648,760 A | 3/1987 | Karlsson et al. | |
| 4,889,455 A | 12/1989 | Karlsson et al. | |
| 4,915,548 A | 4/1990 | Fouquer et al. | |
| 4,966,500 A | 10/1990 | Tsujimura et al. | |
| 5,032,049 A | 7/1991 | Hessman et al. | |
| 5,158,402 A * | 10/1992 | Satran et al. | 407/113 |
| 5,221,164 A | 6/1993 | Allaire | |
| 5,232,319 A | 8/1993 | Satran et al. | |
| 5,302,060 A | 4/1994 | Nystrom et al. | |
| 5,340,246 A | 8/1994 | Tukala | |
| 5,437,522 A * | 8/1995 | Satran et al. | 407/42 |
| 5,486,073 A | 1/1996 | Satran et al. | |
| 5,509,761 A | 4/1996 | Grossman et al. | |
| 5,593,255 A | 1/1997 | Satran et al. | |
| 5,597,271 A | 1/1997 | Men et al. | |
| 5,709,509 A | 1/1998 | Wegener et al. | |
| 5,720,583 A | 2/1998 | Bohnet et al. | |
| 5,727,919 A | 3/1998 | Heumann et al. | |
| 5,807,031 A | 9/1998 | Arai et al. | |
| 5,895,179 A | 4/1999 | Gschwend et al. | |
| 5,947,650 A | 9/1999 | Satran et al. | |
| 5,957,635 A | 9/1999 | Nuzzi et al. | |
| 5,971,672 A | 10/1999 | Hansson | |
| 5,975,812 A | 11/1999 | Friedman | |
| 6,019,553 A | 2/2000 | Yakamavich, Jr. | |
| 6,039,515 A * | 3/2000 | Lamberg | 408/188 |
| 6,200,077 B1 | 3/2001 | Svenningsson et al. | |
| 6,224,300 B1 | 5/2001 | Baxivanelis et al. | |
| 6,257,807 B1 | 7/2001 | Heinloth | |
| 6,336,776 B1 | 1/2002 | Noggle | |
| 6,527,486 B2 | 3/2003 | Wiman et al. | |
| 6,543,970 B1 | 4/2003 | Qvarth et al. | |
| 6,712,563 B2 | 3/2004 | Maier | |
| 6,733,212 B2 | 5/2004 | Nagaya et al. | |
| 6,783,306 B2 * | 8/2004 | Popke | 407/113 |
| 6,929,432 B2 | 8/2005 | Roman et al. | |
| 6,948,891 B2 | 9/2005 | Roman | |
| 7,121,772 B2 | 10/2006 | Krahula et al. | |
| 7,175,370 B2 | 2/2007 | Scherbarth | |
| 7,192,224 B2 | 3/2007 | Fritsch et al. | |
| 7,341,408 B2 | 3/2008 | Kratz | |
| 7,351,017 B2 * | 4/2008 | Kruszynski et al. | 408/223 |
| 7,374,372 B2 | 5/2008 | Rofner et al. | |
| 7,431,540 B2 | 10/2008 | Lof et al. | |
| 7,438,508 B2 | 10/2008 | Alm et al. | |
| 7,513,717 B2 | 4/2009 | Engstrom et al. | |
| 7,677,845 B2 | 3/2010 | Limell et al. | |
| 7,695,221 B2 | 4/2010 | Kruszynski et al. | |
| 7,758,287 B2 | 7/2010 | Alm et al. | |
| 7,837,417 B2 | 11/2010 | Blomstedt | |
| 7,857,555 B2 | 12/2010 | Wermeister | |
| 7,905,687 B2 | 3/2011 | Dufour et al. | |
| 7,909,546 B2 | 3/2011 | Nada et al. | |
| 7,922,427 B2 | 4/2011 | Spitzenberger et al. | |
| 7,972,091 B2 | 7/2011 | Svenningsson et al. | |
| 8,157,489 B2 | 4/2012 | Wolf et al. | |
| 8,192,113 B2 | 6/2012 | Limell et al. | |
| 8,197,163 B2 | 6/2012 | Nasu et al. | |
| 2003/0223832 A1 | 12/2003 | Roman et al. | |
| 2003/0223833 A1 * | 12/2003 | Roman | 408/224 |
| 2005/0111928 A1 * | 5/2005 | Stanarius et al. | 409/132 |
| 2007/0160433 A1 | 7/2007 | Lee et al. | |
| 2008/0131217 A1 | 6/2008 | Kruszynski et al. | |
| 2008/0226403 A1 | 9/2008 | Craig | |
| 2009/0071723 A1 | 3/2009 | Mergenthaler et al. | |
| 2009/0238649 A1 | 9/2009 | Kruszynski et al. | |
| 2009/0245949 A1 * | 10/2009 | Takahashi et al. | 407/42 |
| 2010/0178122 A1 | 7/2010 | Bae | |
| 2010/0209203 A1 | 8/2010 | Cao | |
| 2010/0329804 A1 | 12/2010 | Okumura | |
| 2012/0027530 A1 | 2/2012 | Agic | |
| 2014/0212235 A1 | 7/2014 | Prast et al. | |

FOREIGN PATENT DOCUMENTS

| | | | | |
|---|---|---|---|---|
| EP | 1902799 A2 | | 3/2008 | |
| JP | 59-196107 A | * | 11/1984 | B23B 51/00 |
| JP | 10-180519 A | * | 7/1998 | B23B 51/00 |
| JP | 2000-061719 A | * | 2/2000 | B23B 51/00 |
| JP | 2002066811 A | | 3/2002 | |
| JP | 2003-094222 A | * | 4/2003 | B23B 51/00 |
| JP | 2009-262277 A | * | 11/2009 | B23B 51/00 |
| JP | 2012143866 A | | 8/2012 | |
| WO | 93/13899 A1 | | 7/1993 | |
| WO | 03/099494 A1 | | 12/2003 | |
| WO | 03/099495 A1 | | 12/2003 | |
| WO | 2008/153233 A1 | | 12/2008 | |
| WO | 2010126693 A1 | | 11/2010 | |

OTHER PUBLICATIONS

PCT Search Report, WO.
Sep. 26, 2013—corresponding matter office action.
Jan. 13, 2015—Notice of Rejection.
PCT/US2014/012282 PCT Search Report.
USPTO, "First Office Action for U.S. Appl. No. 13/552,964", dated Jan. 13, 2015, 29 pages.
European Patent Office, "extended European search report for Application No. EP 12 81 7536", dated Feb. 13, 2015, 6 pages.

* cited by examiner

INDEXABLE DRILL INSERT

BACKGROUND

1. Field of the Invention

Embodiments of the present disclosure relate to a drill insert, more particularly embodiments relate to a quadrangular indexible drill insert for use in a pocket of a drill body. Embodiments of the present disclosure also relate to a drill having such an insert.

2. Background Information

Drilling tools are used to drill cylindrical holes in metallic work pieces. The cutting or boring action of the drilling tools may be carried out by an elongated, substantially cylindrical drilling tool, such as a combination of a tool holder and a drill insert, which is selectively attached thereto. Such an arrangement may then be used in an application wherein one end of the tool holder is securely mounted in a driving apparatus, which rotates the holder about its longitudinal axis. At the opposite end of the elongated tool holder, the cutting insert engages the material to be cut. Alternatively, the work piece may be made to rotate relative to the holder and cutting insert, such as in positioning the holder in the tail stock of a lathe or the like. Further, the tool and work piece may be made to rotate relative to one another. The use of cutting inserts allows for quick changing of the insert upon wear of the cutting surfaces instead of the entire tool, and allows for one tool to be used for a variety of different boring applications by simply changing the insert and not the entire drill assembly.

Indexable drill inserts play a very important role in drilling because all the sides of an insert can be used for cutting one after the other. Further, use of inserts reduces the manufacturing lead time and assembling time.

The use of quadrangular indexable drill inserts is known in the art. However, the inserts which are in the art comprise four rectangular cutting edges for cutting the work piece. The use of rectangular cutting edges generally makes the drill drift away from its center because of the forces acting all over the drill body and not exactly at the center. The drill drift further creates a narrow wall which is not feasible in practical applications. Conventional indexable drill inserts rub the surface of the drilled hole, if the diameter of the drill hole is less than the pre-desired value.

In view of the aforementioned disadvantages, it is necessary to develop a drill insert having four identical cutting edges

SUMMARY OF THE INVENTION

The shortcomings of the prior art are overcome and additional advantages are provided through the provision of drill insert in accordance with aspects of the present disclosure. Additional features and advantages are realized through the techniques of the present disclosure. Other embodiments and aspects of the disclosure are described in detail herein and are considered a part of the claimed disclosure.

The disclosure provides a quadrangular indexable drill insert 1 comprising a substantially flat top surface 2, a bottom surface 3, and a side surface 4 adjoining the top surface 2 and the bottom surface 3 from four sides of the drill insert 1, wherein the bottom surface 3 is smaller than the top surface 2 to provide positive cutting geometry; four cutting edges 5 configured at the intersection of the side surfaces 4 and the top surface 2, each of the cutting edges 5 comprising a first part edge 5a oriented towards the axis of drill body 6; a second part edge 5b extending from the first part edge 5a; a third part edge 5c extending away from the insert axis, wherein the second and the third part edges 5b and 5c are joined together by a transitional part edge 7, the transitional part edge 7 makes an angle in the range of from about 10° to about 90° with respect to the reference horizontal axis and makes a convex curve 7b with the second part edge 5b and a concave curve 7a with the third part edge 5c; a nose portion 8 of predetermined radius at four corners of the drill insert 1 adjoining the first part edge 5a of one cutting edge 5 with the third part edge 5c of a succeeding cutting edge 5; and an insert screw hole 9 at the center of the drill insert 1 for mounting with the drill body 6.

In one embodiment, the first part edge 5a, the second part edge 5b and the third part edge 5c are linear.

In one embodiment, the first part edge 5a makes a negative slope with respect to a reference horizontal plane 18 and is disposed at an angle in the range of from about 0° to about 25°.

In one embodiment, the second part edge 5b is parallel with respect to a reference horizontal plane 18 of the drill insert 1.

In one embodiment, the third part edge 5c makes a positive slope with respect to a reference horizontal plane 18 and is disposed at an angle in the range of from about 0° to about 20°.

In one embodiment, the nose portion 8 has radius in the range of from about 0.4 mm to about 1 mm.

In one embodiment, the side surface 4 is configured into a first clearance face 4a extending from the top surface 2 and a second clearance face 4b extending from the first clearance face 4a to the bottom surface 3.

In one embodiment, the first clearance face 4a makes an angle in the range of from about 1° to about 9°, with respect to an insert axis 19.

In one embodiment, the second clearance face 4b makes an angle in the range of from about 10° to about 30° with respect to the insert axis 19.

In one embodiment, the drill insert 1 is a central insert, and is mounted in a central pocket 6a of the drill body 6.

In one embodiment, the first part edge 5a, the second part edge 5b and the transitional part edge 7 together form a length in the range of from about 10% to about 55% of the total length of the cutting edge 5.

In one embodiment, a drill 10 comprising a quadrangular indexable drill insert 1 mounted in a central pocket 6a and a peripheral insert 11 mounted in a peripheral pocket 6b.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING FIGURES

Novel features and characteristics of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the disclosure.

To overcome drawbacks mentioned in the background, a quadrangular indexable drill insert is developed. A drill insert in accordance with the disclosure includes four identical cutting edges having a plurality of part edges which direct the forces to the center and towards the backend of the drill body, and helps to prevent drifting of the drill body from its center during drilling operation.

Figure 1:
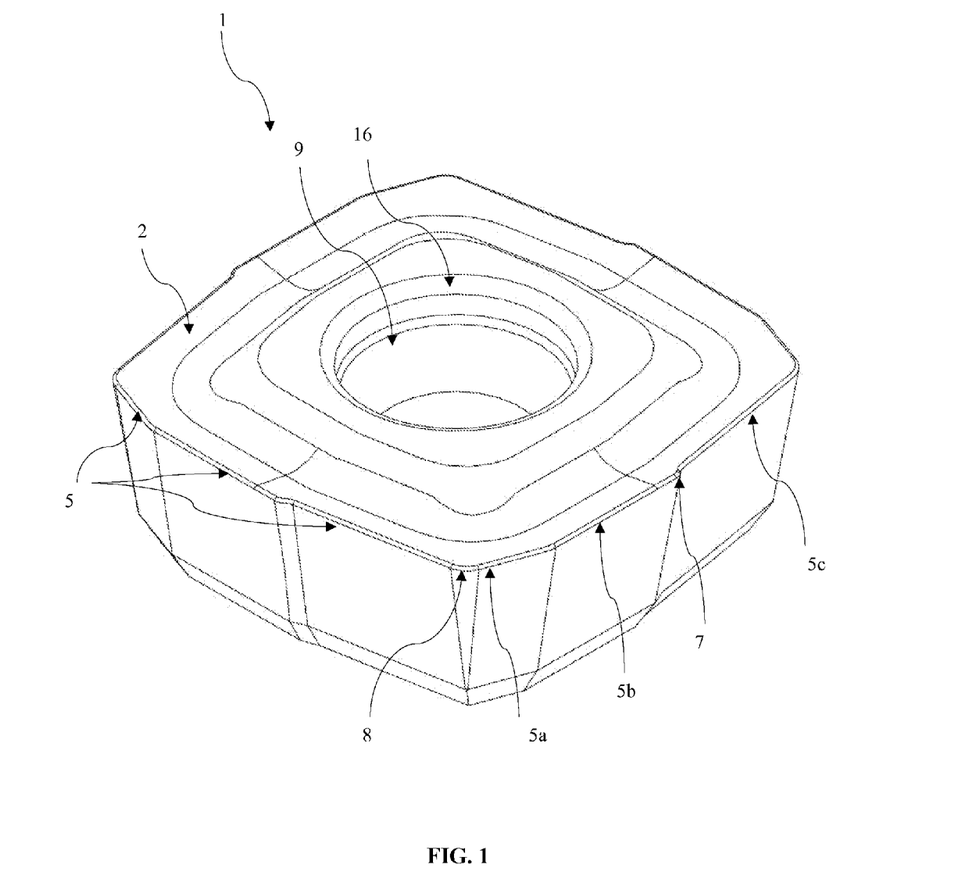
FIG. 1 shows a top isometric view of an embodiment of a drill insert according to the disclosure.
Figure 2:
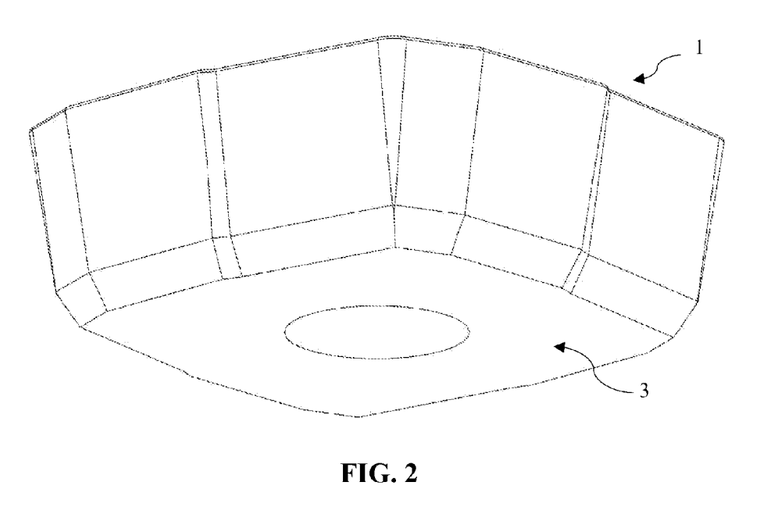
FIG. 2 shows a bottom isometric view of the drill insert of FIG. 1.

FIGS. 1 and 2 illustrate top and bottom isometric views of an indexable drill insert 1 in accordance with the disclosure. The embodiment of the drill insert 1 is used in the inner/central pocket of the drill/drill tool 10 (FIGS. 7 and 8), hence it is called inboard, or an inboard insert. The drill insert 1 comprises a top surface 2 and a bottom surface 3 and a side surface 4 adjoining the top and bottom surfaces 2 and 3 respectively. The top surface 2 of the drill insert 1 is made bigger than the bottom surface 3 in order to provide positive cutting geometry between the drill insert 1 and a pocket 6a in a drill body 6 (FIGS. 5-8). The top surface 2 is intersected by the side surface 4 to form a cutting edge 5 on each side of the insert 1. Each cutting edge 5 is divided into plurality of part edges 5a, 5b and 5c. The part edges direct the applied force to the drill body through a drill axis 17 and prevent drifting of the drill body 6 from its center. The first part edge 5a makes a negative slope i.e. the first part edge 5a is oriented outwardly towards the drill axis 17 and makes an angle $\alpha$ in the range of from about 0° to about 25°. In one embodiment, the angle $\alpha$ is about 20° with respect to a reference horizontal plane 18 of the drill insert 1. The second part edge 5b extends from other end of the first part edge 5a and is parallel to the reference horizontal plane 18 of the drill insert 1. The third part edge 5c is connected to the second part edge 5b via a transitional part edge 7. The first part edge 5a, the second part edge 5b and the third part edge 5c are linear in nature. The third part edge 5c is oriented away from the center of the insert 1. The transitional part edge 7 is a spline forming a convex curve 7b with the second part edge 5b and a convex curve 7a with the adjoining third part edge 5c. Corners of each cutting edge 5 are configured as nose portions 8 having corner/nose radii R in the range of from about 0.4 mm to about 1 mm. In one embodiment, the radii R are about 0.5 mm. The nose portion 8 is connected to the third part edge 5c of one cutting edge 5 and a first part edge 5a of a subsequent cutting edge 5. The corner radius R is dependent on the thickness T of the insert 1 and the diameter D of an imaginary inscribed circle 12.

The drill insert 1 further includes an insert screw hole 9 disposed at a center and extending from top surface 2 to the bottom surface 3 of the drill insert 1 for mounting the insert 1 to the drill body 6. Also, a mouth portion 16 is provided at the insert screw hole 9 on the top surface 2 for connectivity between the drill insert 1 and the drill body 6 through an insert screw 15. The mouth portion 16 further include a shoulder surface 16a for supporting the screw head 15a of the screw 15 during clamping with the drill body 6. The mouth portion 16 is further provided with a protruded portion 20 around the insert screw hole 9 at the top surface 2. The protruded portion 20 facilitates cutting of the chips (not shown) produced during drilling operation and directing the cut chips to the helical flute portion 14 of the drill body 6 and thus vacates the chips from the drill 10.

Figure 3A:
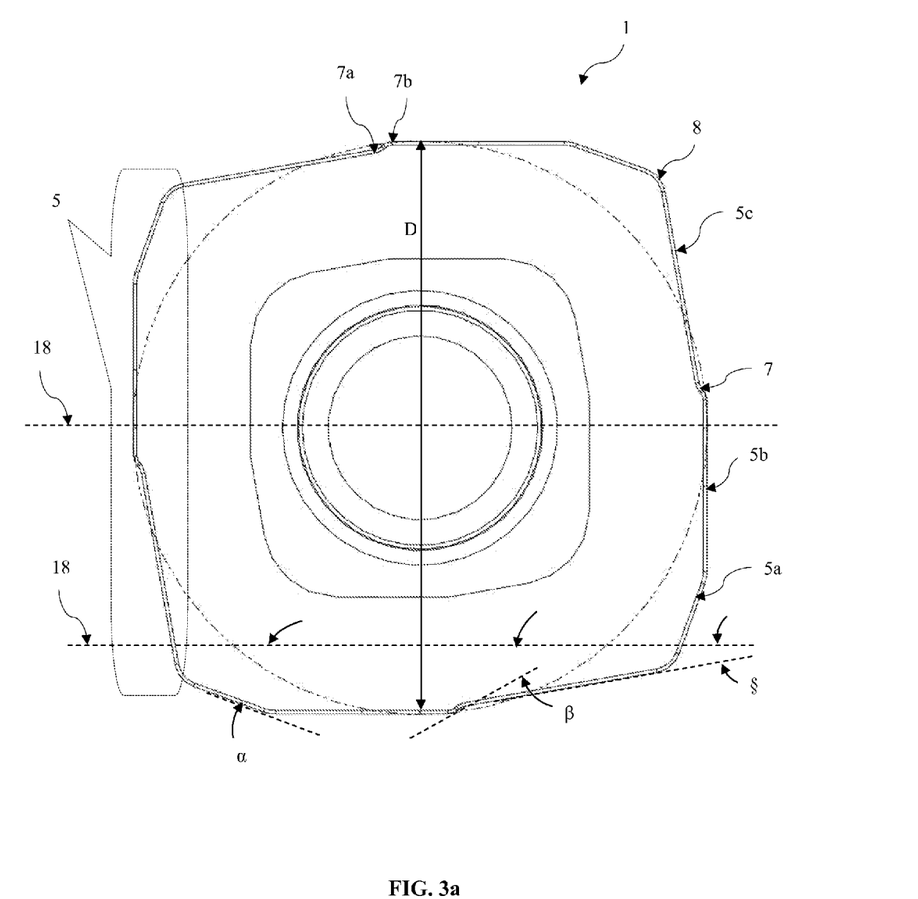
FIGS. 3a and 3b show top views of the drill insert of FIG. 1.
Figure 3B:
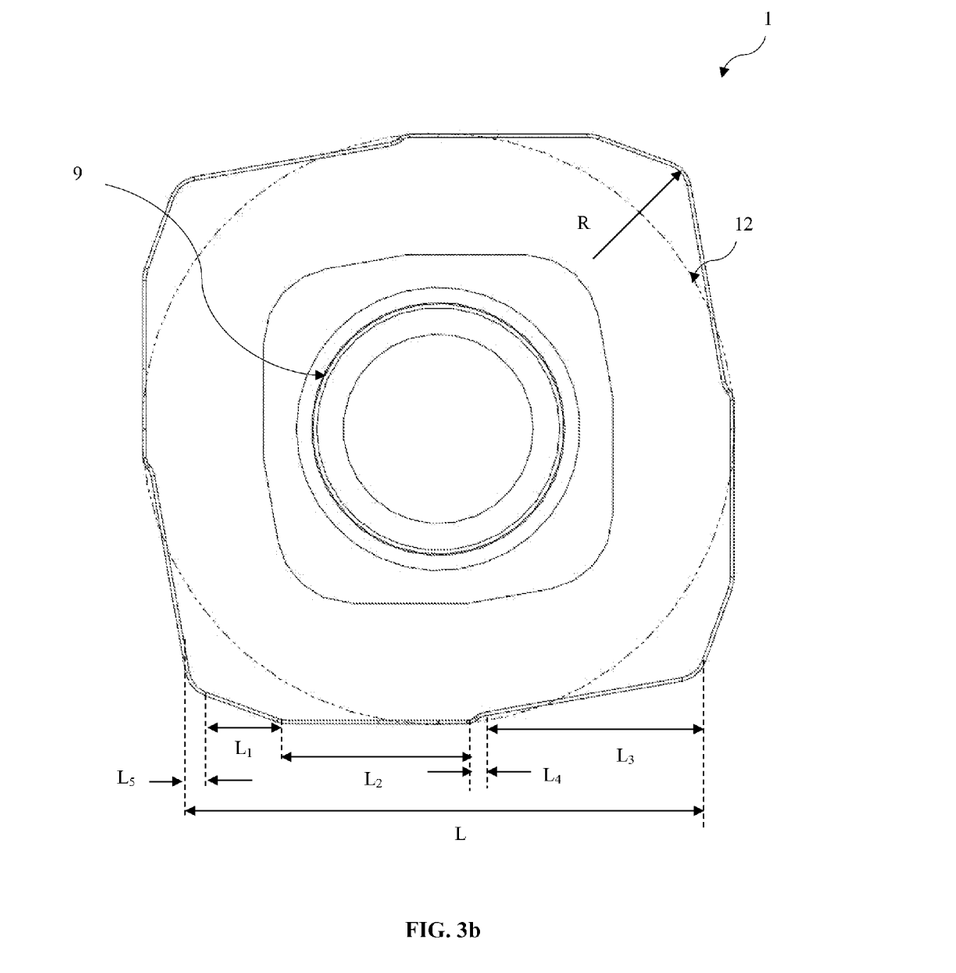

With reference to FIGS. 3a and 3b, the figures illustrate top views of the drill insert 1 according to the disclosure. The characterization of the cutting edge 5 into three part edges 5a, 5b and 5c along with a transitional edge 7 is clearly illustrated in the top views of the drilling insert 1. The part edges 5a, 5b and 5c with a transitional edge 7 of the inboard insert 1 along with an outboard insert 11 (FIGS. 5-7) direct the forces to the center of the drill body 6 or the drill axis 17 (FIG. 8), thus preventing drifting of the drill 10 from the drill axis 17.

Although only the part edges 5a, 5b and 5c are labeled on the right hand side of the insert 1 in FIG. 3a, it is to be appreciated that the other three sides likewise have the same corresponding edges. Continuing to refer to FIG. 3a, the first part edge 5a is provided at an angle $\alpha$ of about 20° and the slope made is negative with respect to the reference plane 18. The second part edge 5b is disposed generally parallel to the reference plane 18 and thus forms an angle of about 0° with respect to the reference plane 18. The third part edge 5c forms an angle § of about 20° with reference to the reference plane 18. The transitional part edge 7 forms an angle $\beta$ in the range of from about 10° to about 90° with reference to the reference plane 18. In one embodiment, the transitional edge part 7 is a small portion of the cutting edge having a steep climb up at an angle $\beta$ of 45 degrees with respect to the reference plane 18 with its slope being positive. This provides a high point between the first part edge 5a and the transitional part edge 7 and thus the transitional part edge 7 makes contact with the workpiece firstly when the insert is given a lead angle between 1 degree and 10 degrees and rotation in a clockwise direction.

For example, as shown in FIG. 3b, the first part edge 5a, the second part edge 5b and the third part edge 5c could have lengths $L_1$, $L_2$, and $L_3$ respectively. The transitional part edge 7 could have a length of $L_4$. The nose portion 8 also contributes to cutting length L of the cutting edge 5 and is denoted by $L_5$. Hence, total length of the cutting edge 5 denoted by L is the sum total of $L_1$, $L_2$, $L_3$, $L_4$, and $L_5$. The part edges 5a, 5b and 5c and the transitional edge 7 are bound to vary in their sizes or lengths as the diameter D of the imaginary inscribed circle 12 varies due to various sizes of the inserts and hence the variation of lengths of the part edges 5a, 5b, 5c and length of transitional edge 7 vary proportionately to the drill insert sizes and drill diameter sizes.

Figure 4A:
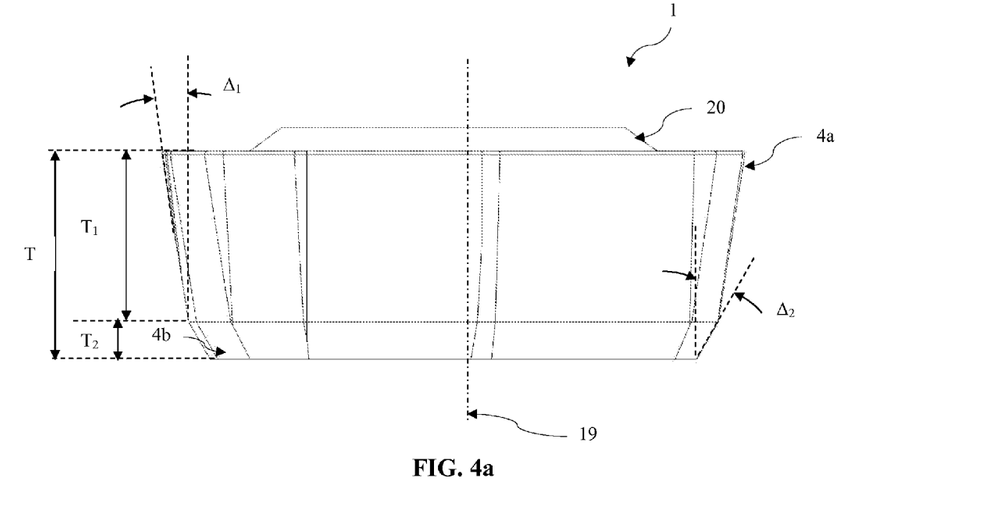
FIG. 4a shows a side view of the drill insert of FIG. 1.

With reference to FIG. 4a, the side surface 4 is configured into a first clearance face 4a and a second clearance face 4b. The first clearance face 4a makes an angle $\Delta_1$ in the range of from about 1° to about 9°, with respect to the drill insert axis 19. In one embodiment, the angle $\Delta_1$ is about 9°. This clearance helps to remove the insert 1 from the pocket 6a of the drill body 6 with ease. The second clearance face 4b makes an angle $\Delta_2$ in the range of from about 10° to about 30° with reference to the drill insert axis 19. The angle $\Delta_2$ of the second clearance face 4b varies depending on thickness $T_1$ of the first clearance face 4a. The second clearance face 4b of thickness $T_2$ is provided at side surface 4 and is towards the bottom surface 3. The second clearance face 4b prevents digging of the pocket 6a of the drill body 6 which in turn eliminates the wear of the pocket 6a during drilling operation. The second clearance face 4b also eliminates rubbing of drilled hole surface (not shown) of the workpiece by the drill insert 1 when diameter of the drilled hole is less than the predetermined value.

Figure 4B:
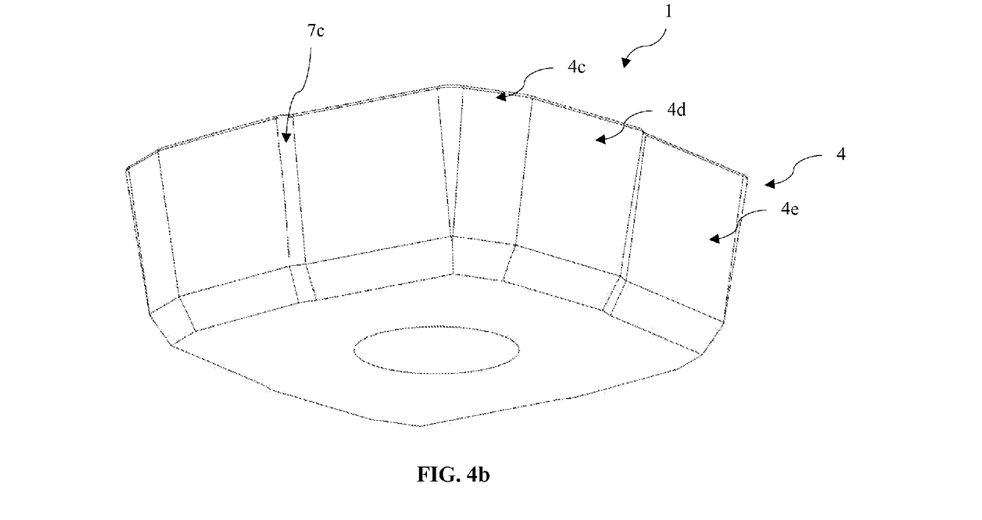
FIG. 4b shows another bottom isometric view of the drill insert illustrating side part edge surfaces of the insert according to the disclosure.
Figure 5:
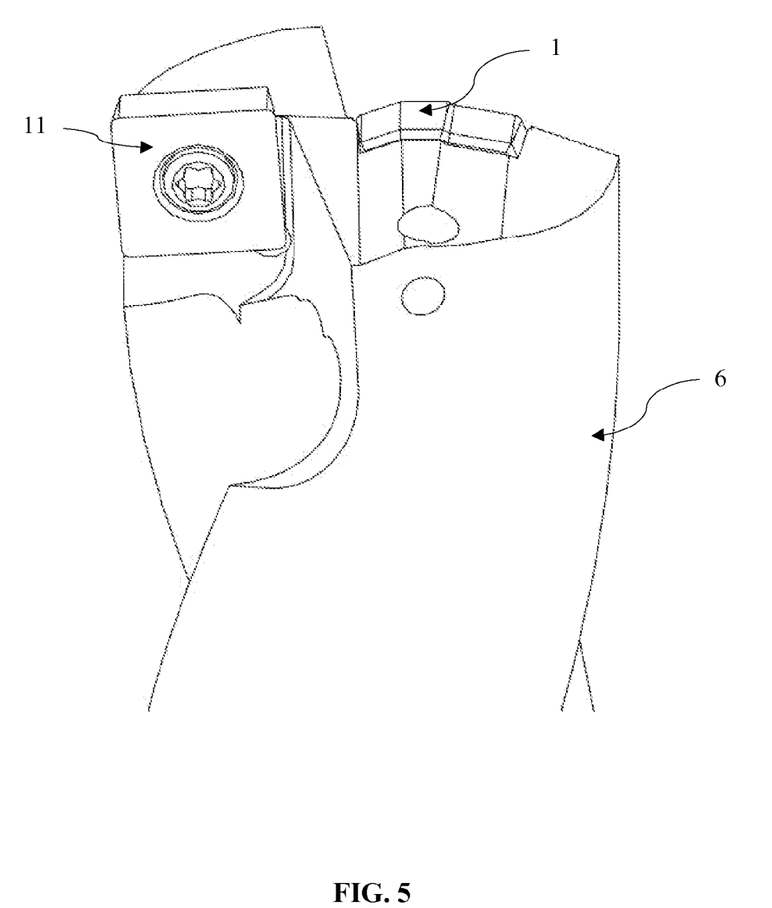
FIGS. 5 and 6 show perspective views of an embodiment of a drill body including a drill insert in a central pocket of the drill body and a peripheral insert in a peripheral pocket of the drill body according to the disclosure.
Figure 6:
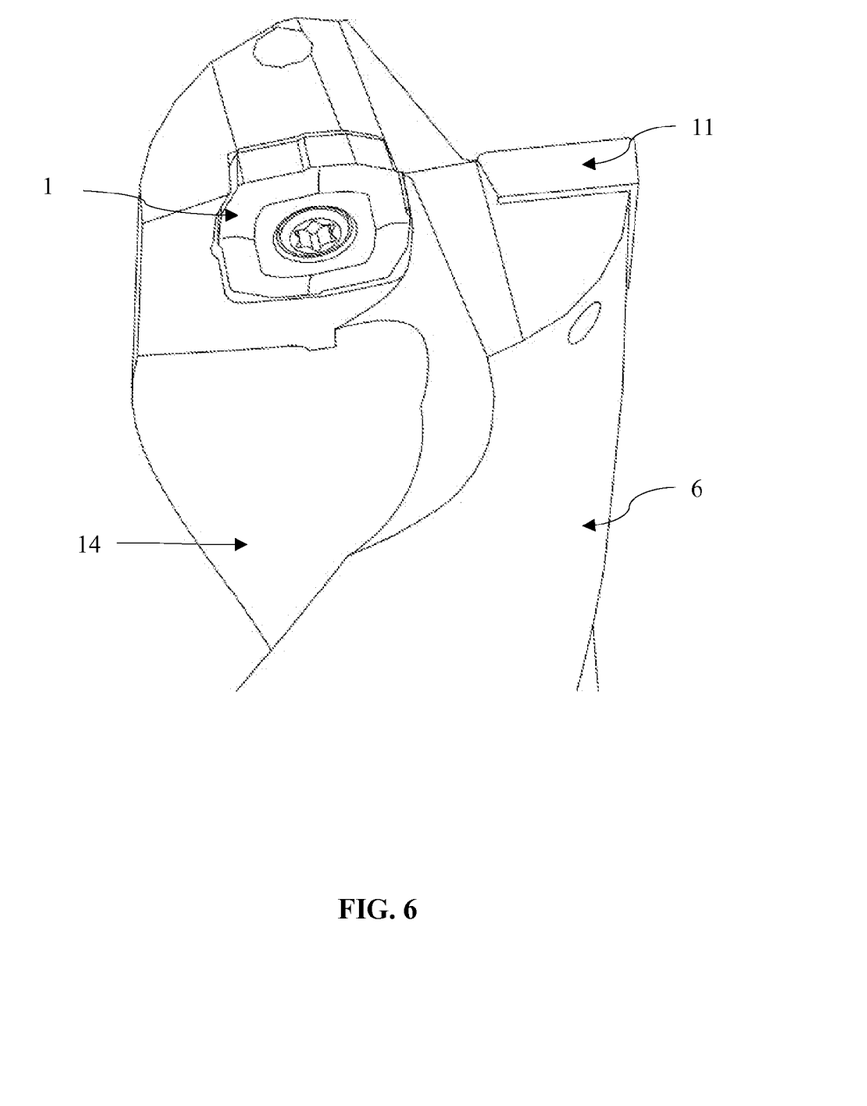
Figure 7:
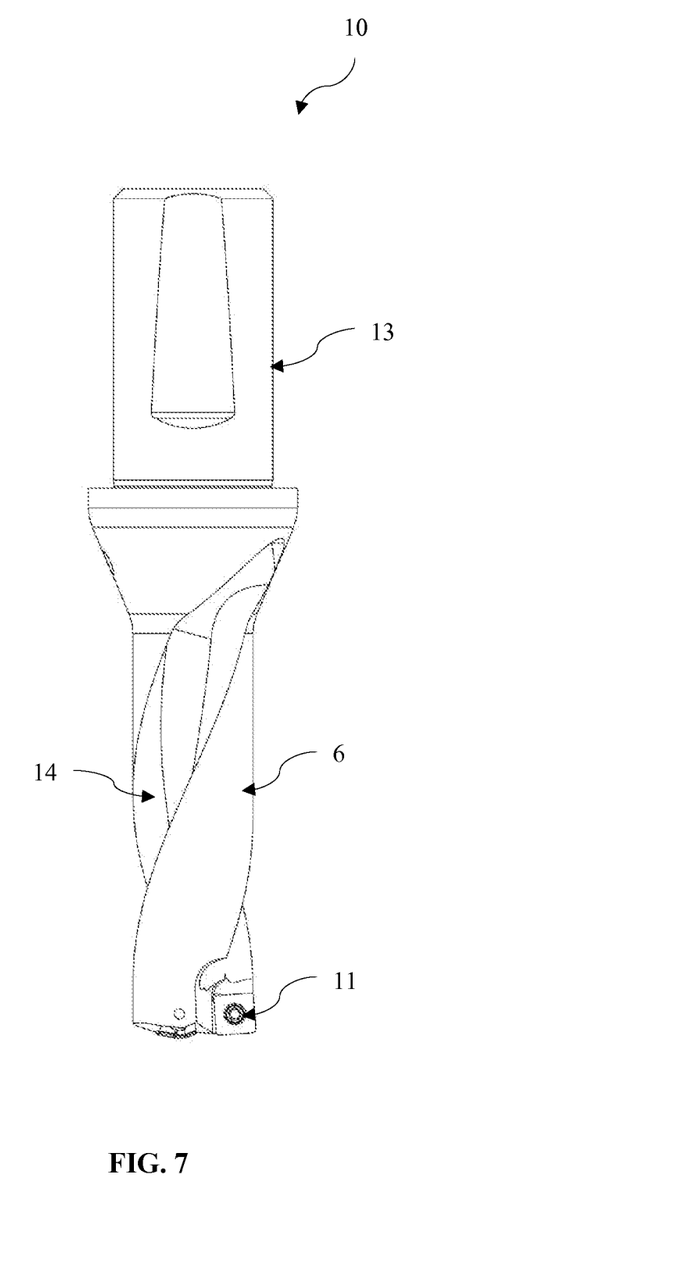
FIGS. 7 and 8 show side views of a drill tool including a drill insert in a central pocket of a drill body and a peripheral insert in a peripheral pocket of the drill body according to the disclosure.
Figure 8:
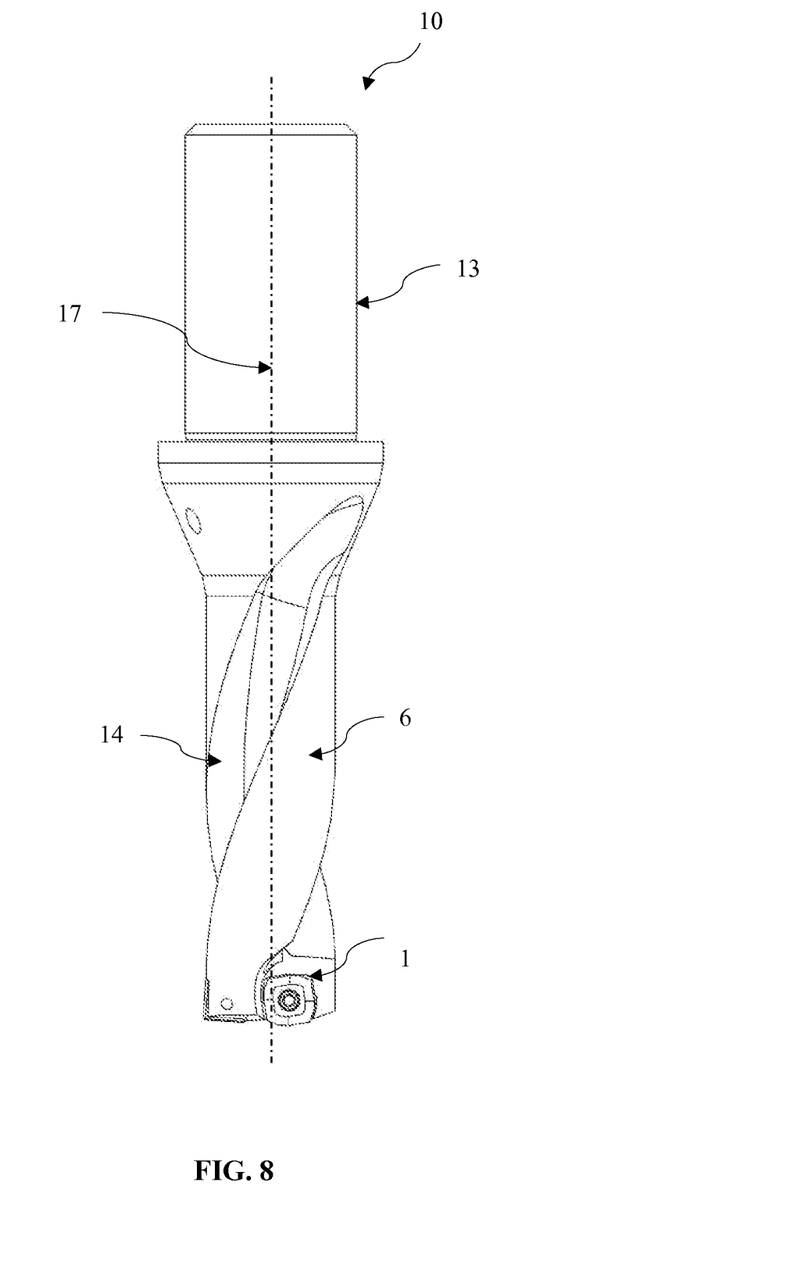

With reference to FIG. 4b, the drill insert 1 includes the side surface 4 which includes the plurality of side part surfaces 4c, 4d, 4e and 7c which intersect the top surface 2 to form the part edges 5a, 5b, 5c and 7 (FIG. 3a) respectively. The side part surfaces 4d and 4e secure the drill insert 1 inside the pocket 6a of the drill body 6 (FIGS. 5-9). The side part surfaces (4c and 7c) do not make contact with inner side walls 21 of the inner/central pocket 6a (FIG. 9) and thus prevents the part edge 5b and transitional part edge 7 from wear. However, the side part edges 4d and 4e make contact with inner side walls 21 of the inner/central pocket 6a to arrest the rotational motion of the drill insert 1 inside the inner/central pocket 6a during drilling operation.

FIGS. 5 to 8, illustrate exemplary embodiments of the drill body 6 having a peripheral insert 11 at a peripheral pocket 6b (not numbered) of the drill body 6 and the inner/inboard insert 1 at inboard/central pocket 6a of the drill body 6. The drill/drill tool 10 includes a shank portion 13 of predetermined length and a drill body 6 of basic cylindrical shape. The drill body 6 includes a pair of insert pockets, one at its center and other at its periphery for accommodating the drill inserts. The drill body 6 also includes a helical flute 14 disposed along its length extending from front end of the drill body 6 for vacating the chips (not shown) generated during the drilling operation. The chips generated during drilling operation are cut by the protruded portion 20 (FIG. 4a) of the drill insert 1 and are guided via the helical flute 14 of the drill body 6 for disposing of the same.

In one embodiment, an inboard/inner insert 1 along with any outboard/peripheral insert are positioned in the drill body 6 such that the forces generated during drilling operation are directed to the drill axis 17, preventing the drill body 6 from drifting away from its center/drill axis 17.

In one embodiment of the disclosure, during drilling operation, the inboard/inner insert initially applies moderate cutting forces, and then the outboard/peripheral insert begins to cut the workpiece.

Figure 9:
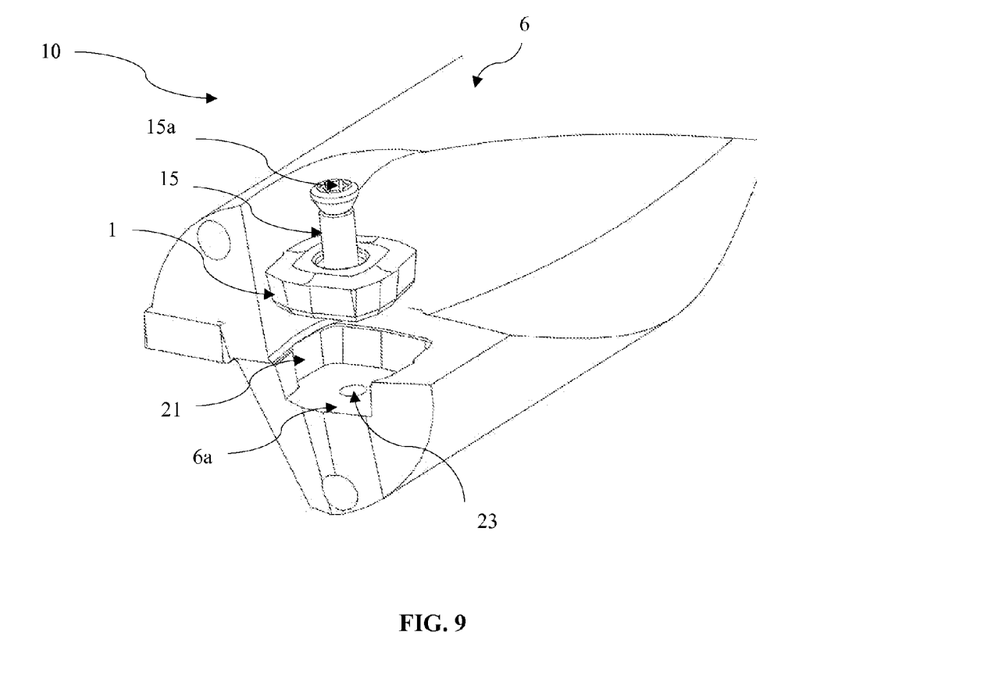
FIG. 9 shows a partially exploded view of a drill tool including a drill insert in a central pocket of the drill body according to the disclosure.

FIG. 9 is an exemplary embodiment which illustrates an exploded view of drill/drill tool 10 comprising a drill insert 1 of the disclosure in the inboard/central pocket 6a of the drill body 6. The drill insert 1 is positioned and matched with the shape of the central pocket 6a for mounting with the drill body 6. Further, the central pocket 6a includes a threaded hole 23 for fastening/clamping the drill insert 1 with the drill body 6 using an insert screw 15. The insert screw 15 includes a screw head 15a which matches with the profile of the shoulder 16a (FIG. 3a) of the mouth surface 16 of the insert 1 and fastens with the central pocket 6a.

The first part edge 5a, the second part edge 5b, the third part edge 5c and the transitional part edge 7 direct the cutting forces to the center of the drill back end. These parts 5a, 5b, 5c and 7 and the cutting part edges (not numbered) of the peripheral insert 11 together balance the cutting forces that the drill encounters during the drilling process and hence keeps the drill from drifting away from the center. Drill drifting would not create a straight hole and may result in an oval hole. Thus, the forces need to be balanced to reduce the vibration of the drill; if not, the surface quality of the hole is reduced. The third part edge 5c and nose portion 8 of the insert 1 together serve another function of protecting the nose portion of the outboard/peripheral insert 11. This is achieved by positioning the nose portion 8 of the inboard insert 1 slightly ahead of the nose portion of the outboard/peripheral insert, in the assembly of both the inserts in the drill body 6. This is carried out to ensure that all the four true cutting edges are available for both the inserts for drilling purpose.

It is to be appreciated that the disclosure provides a quadrangular indexable drill insert for central/inboard pocket in which all four cutting edges are used for drilling, i.e. when one edge wears out the subsequent edge can be used for cutting.

The disclosure provides a quadrangular indexable drill insert which has four identical cutting edges which are divided into a plurality of part edges to direct the forces to the drill axis and thus minimizes the drifting of the drill from its center.

The disclosure provides a quadrangular indexable drill insert which has a second clearance face/chamfer at its bottom surface to prevent rubbing of the drilled hole by the insert.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A quadrangular indexable drill insert comprising:
a top surface;
a bottom surface smaller than the top surface;
four side surfaces, each adjoining the top surface and the bottom surface from one of four sides of the drill insert;
an insert screw hole disposed at the center of the drill insert; and
four cutting edges, each configured at the intersection of one of the side surfaces and the top surface, each of the cutting edges comprising:
a first part edge extending from a first nose portion;
a second part edge extending from the first part edge; and
a third part edge extending to a second nose portion,
wherein the first part edge and the second part edge are joined by a convex corner such that each of the first part edge and the second part edge merge directly into the convex corner,
wherein the second part edge is disposed parallel with respect to a reference axis,
wherein the first part edge is disposed at a first angle with respect to the reference axis such that the first part edge is closer to the reference axis near the first nose portion than near the second part edge,
wherein the second part edge and the third part edge are joined together by a transitional part edge, the transitional part edge forming an angle in the range of from about 10° to about 90° with respect to the reference axis,
wherein the third part edge is disposed at a second angle with respect to the reference axis such that the third part edge is closer to the reference axis near the second nose portion than near the transitional part edge,
wherein the transitional part edge forms a convex curve with the second part edge and a concave curve with the third part edge, and
wherein the first nose portion is of a predetermined radius and joins the first part edge of one cutting edge with the third part edge of a succeeding cutting edge.

2. The drill insert of claim 1 wherein the first part edge, the second part edge, and the third part edge are linear.

3. The drill insert of claim 1 wherein the first angle is in the range of from about 0° to about 25°.

4. The drill insert of claim 1 wherein the second angle is in the range of from about 0° to about 20°.

5. The drill insert of claim 1 wherein the first nose portion and the second nose portion each are defined by a radius in the range of from about 0.4 mm to about 1 mm.

6. The drill insert of claim 1 wherein each side surface comprises a first clearance face extending from the top surface and a second clearance face extending from the first clearance face to the bottom surface.

7. The drill insert of claim 6 wherein the first clearance face forms an angle in the range of from about 1° to about 9° with respect to the insert axis.

8. The drill insert of claim 6 wherein the second clearance face forms an angle in the range of from about 10° to about 30° with respect to the insert axis.

9. The drill insert of claim 1 wherein the first part edge, the second part edge and the transitional part edge of a respective cutting edge together form a length in the range of from about 10% to about 55% of the total length of the respective cutting edge.

10. A drill comprising:
a drill body having a central pocket and a peripheral pocket formed therein; and
a quadrangular indexable drill insert as recited in claim 1 mounted in the central pocket.

11. The drill of claim 10 wherein the drill body is rotatable about a central longitudinal axis, wherein one cutting edge of the four cutting edges is positioned to engage a workpiece when the drill body is rotated about the central longitudinal axis, and wherein the first part edge of the one cutting edge is disposed nearer the central longitudinal axis than the third part edge of the one cutting edge.

* * * * *